Dec. 25, 1934.    T. D. NATHAN    1,985,325
JOINT AND METHOD OF MAKING THE SAME
Filed May 15, 1933    3 Sheets-Sheet 3
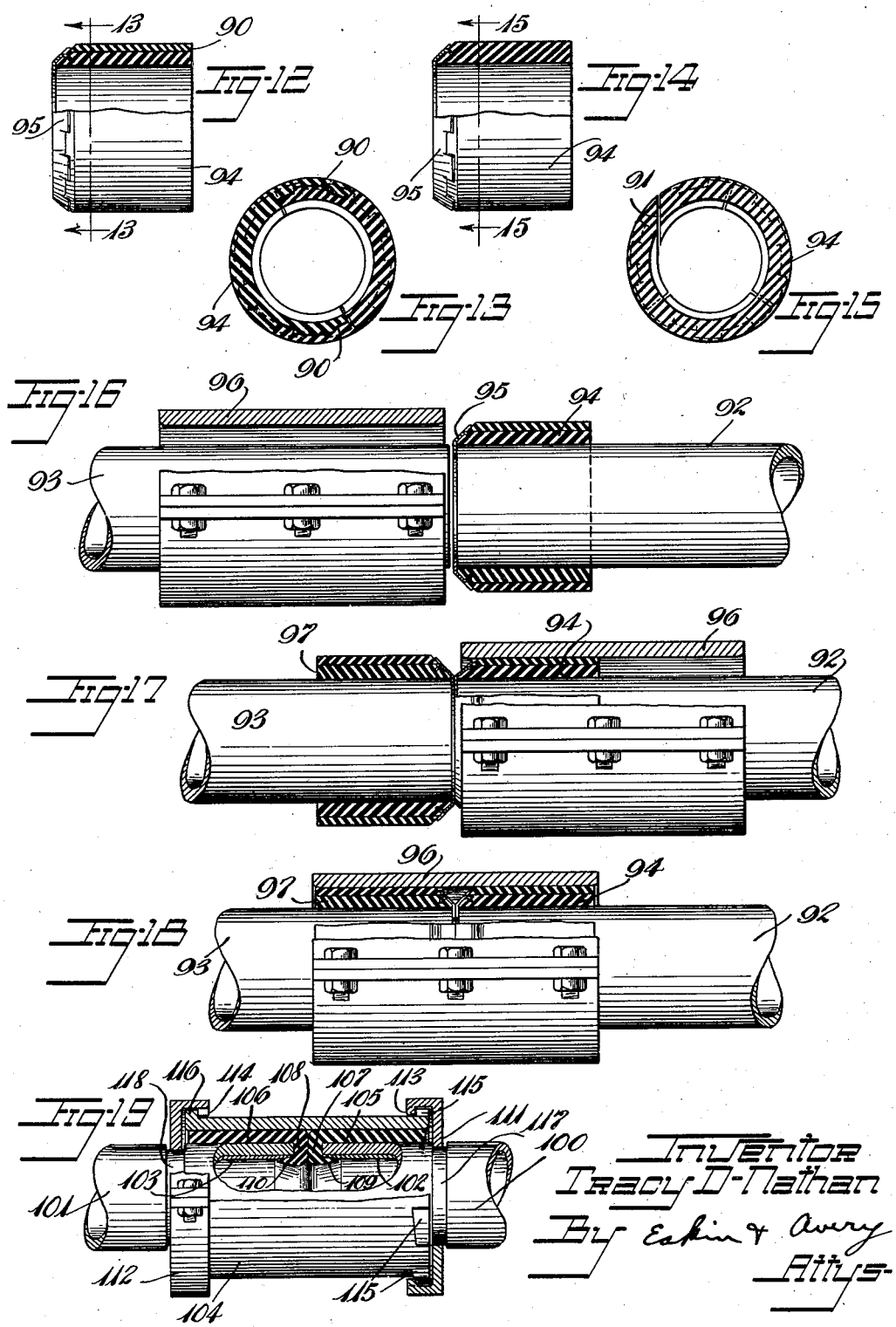

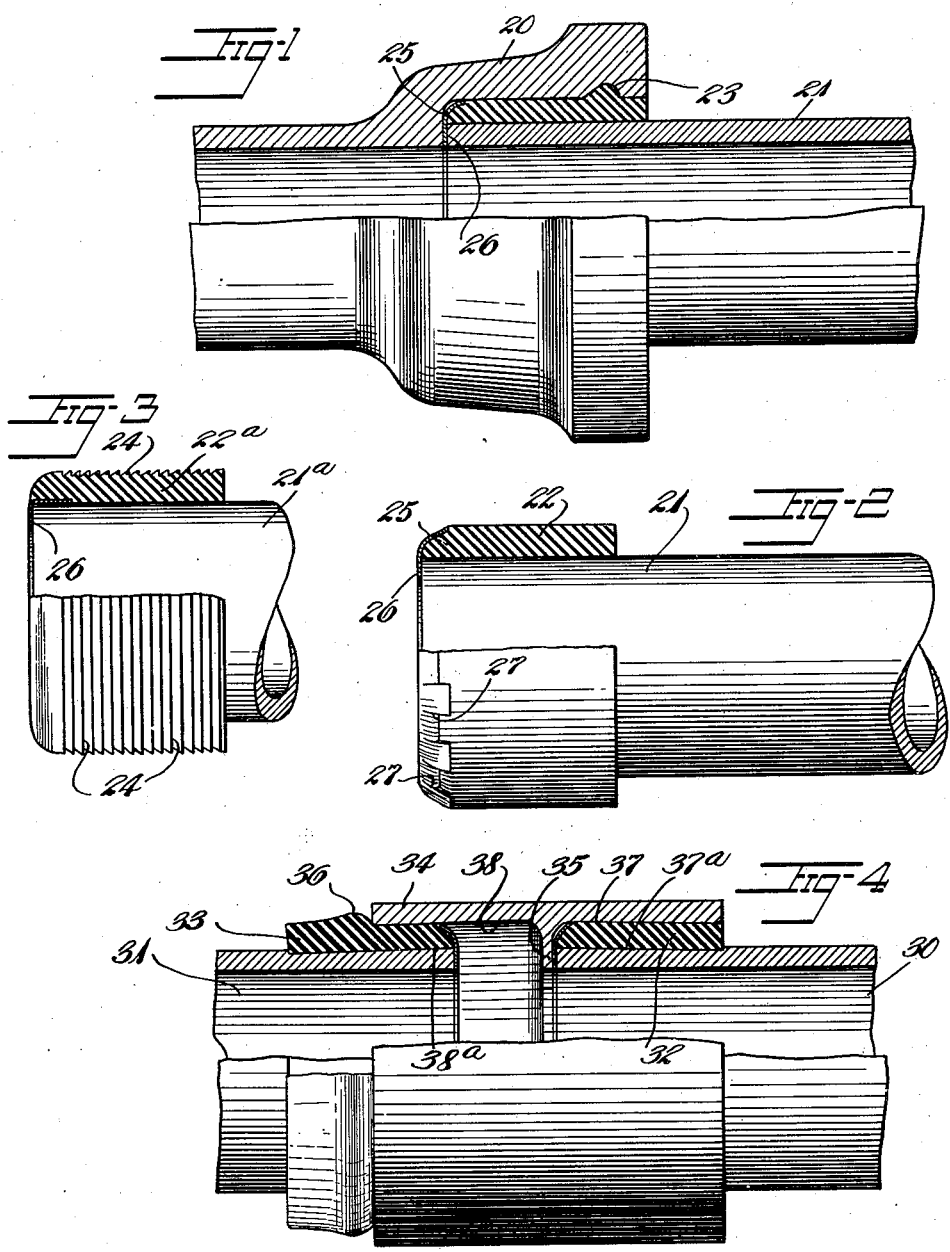

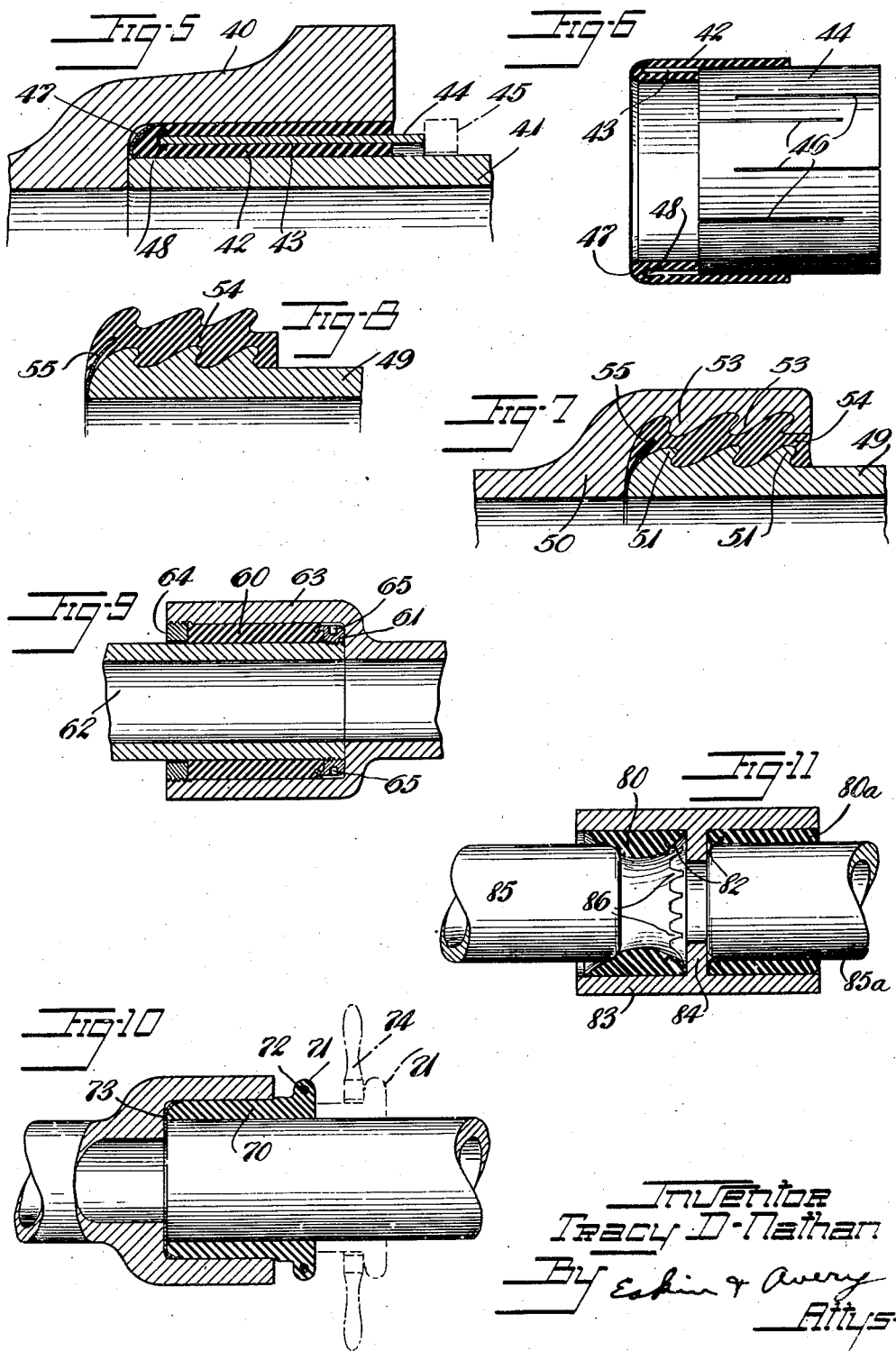

Patented Dec. 25, 1934

1,985,325

UNITED STATES PATENT OFFICE 1,985,325

JOINT AND METHOD OF MAKING THE SAME

Tracy D. Nathan, Akron, Ohio, assignor to The B. F. Goodrich Company, New York, N. Y., a corporation of New York Application May 15, 1933, Serial No. 671,090

16 Claims. (Cl. 285—163)

This invention relates to joining of pipe sections or other structure adapted to be assembled telescopically with annular cushioning or sealing elements disposed between them.

Chief objects are to provide a joint that is strong and durable and does not require clamping devices for holding the parts in the cushioning or sealing relation, and to provide for convenience of assembly.

Further objects are to provide an improved joint for pipe sections subjected to high fluid pressure, to provide for effectively resisting axial separation of the pipe sections, to provide for guarding the sealing element from deterioration resulting from contact with the conducted fluid, to provide for adequately cushioning the pipe sections against excessive vibration which might be caused by exterior influences or by fluctuations in the conducted fluid, and to provide for permitting the coupled pipe sections to be moved somewhat angularly with relation to each other without lessening the effectiveness of the sealing or cushioning function of the joint.

Still further objects are to provide improved procedure for joining associated pipe ends without requiring axial displacement of the sections to effect the assembly, this being of advantage especially in repairing an already laid pipe line.

These and further objects will be apparent from the following description, reference being had to the accompanying drawings in which:

Fig. 1 is an elevation, with parts broken away and sectioned, of a bell and spigot pipe joint constructed according to and embodying a preferred form of the invention.

Fig. 2 is an elevation, with parts broken away and sectioned, of the spigot section and associated sealing element of Fig. 1, before they are assembled with the bell section.

Fig. 3 is a view similar to Fig. 2 but showing a modified sealing element.

Fig. 4 is a view similar to Fig. 1 but showing a modified pipe and joint construction.

Fig. 5 is a longitudinal section of a bell and spigot joint showing a further modification.

Fig. 6 is an elevation on a reduced scale, with a part in longitudinal section, of the sealing elements of Fig. 5, before their assembly in the joint.

Fig. 7 is a longitudinal section of a further modified bell and spigot joint construction.

Fig. 8 is a longitudinal section of the spigot and sealing element of Fig. 7 before assembly.

Figs. 9, 10 and 11 are longitudinal sections of still further modified joint constructions.

Figs. 12 and 14 are elevations, with parts broken away and sectioned, of modified forms of sealing elements.

Figs. 13 and 15 are sections along the lines 13—13 and 15—15 of Figs. 12 and 14, respectively.

Figs. 16, 17 and 18 are elevations, with parts broken away and sectioned, of a modified joint construction in which the sealing member of Figs. 12 and 13 is utilized, these views illustrating successive stages in the procedure of assembling this joint.

Fig. 19 is a view similar to Fig. 18 but showing a further modification.

In Fig. 1 a bell pipe section 20 and a spigot pipe section 21, both of which may be of standard construction, are assembled with an annular, resilient sealing element 22, preferably of soft, resilient rubber composition, which is of an annular form somewhat greater in radial thickness than the corresponding dimension of the annular space between the assembled bell and spigot. The sealing element is held compressed radially between the ball and spigot and is free to expand resiliently in the longitudinal direction rearwardly along the spigot section in compensation for the radial compression. An annular groove 23, commonly found in standard bell sections, is not essential for the purposes of the invention, but is beneficial inasmuch as it provides a form of interlock with the rubber of the sealing element, resisting relatively longitudinal movement of the bell.

At the leading end of the sealing element 22 is disposed an annular nosing member 25 of relatively stiff but flexible material, preferably sheet metal, which embraces the end of the rubber and restrains the latter from bulging inwardly at the end of the spigot section where the rubber would be likely to prevent complete entry of the spigot, and also would be exposed to the wash of the fluid and consequently would be subject to disintegration. This member is especially desirable where the fluid contains oil or other rubber-swelling substance which temporarily weakens the rubber unless the latter is restrained from swelling. The metal member 25 is utilized also to facilitate assembly of the rubber annulus in the joint and for this purpose the member 25 is fixed to the rubber, preferably by vulcanized adhesion, and the member is provided with a radially inward extending flange 26 which engages the end of the spigot section.

For the operation of assembling the parts, the rubber annulus is mounted upon the end portion of the spigot section with the flange 26 engaging the end face of the section, as shown in Fig. 2, and this assembly is then forcibly inserted into the bell section, the rubber annulus being reduced in thickness radially in this operation progressively along its length and being expanded or stretched rearwardly along the spigot surface in compensation for the radial compression, while at the same time it is restrained from movement relative to the spigot at the extreme end thereof by the holding ring 25. If desired, the sliding surfaces may be lubricated with a soap or other suitable lubricant, but this is not essential.

In order to facilitate the entrance of the sealing structure, the ring 25 and the adjacent leading portion of the rubber are preferably of the tapered or conical form shown, and to facilitate any necessary distortion of the ring 25 without objectionable buckling of it, this ring may be slotted as at 27, 27.

By this manner of assembly the rubber does not have opportunity to bulge inwardly ahead of the spigot and the possibility for the parts to be defectively assembled is reduced to a minimum. Moreover, the rubber is positively stretched axially during the insertion, which facilitates the proper assembly even with relatively very thick annuli in which a considerable reduction in thickness is required for the assembly, this being especially desirable in some cases to provide a large amount of available axial recoil in the rubber with a correspondingly strong and lasting radial pressure against the pipe walls to seal against high fluid pressures.

The large amount of available axial recoil moreover gives assurance that the effectiveness of the seal will be maintained even when the pipe sections are somewhat angularly displaced with relation to each other, as where there is a disturbance of the soil or other support, and rubber, which is of considerable radial thickness, is effective to cushion the pipe sections against severe vibratory influences, whether caused by pulsation in the conducted fluid or by external disturbances.

In the modification of Fig. 3 the metal nosing is provided as before with a flange 26a engaging the end of the spigot section 21a, but in this form the metal extends along the inner periphery of the rubber annulus 22a, instead of at the leading end face of the latter, to prevent inward bulging of the rubber in case of longitudinal separation of the spigot and from the flange 26a in a sufficient amount in the assembled structure to render such bulging likely, as where the pipe sections are subject to considerable contraction by temperature changes. In this event the rubber annulus usually rides with the bell section because of the greater rubber-contacting surface and consequently greater resistance to relative movement of the bell and rubber. As little or no flexure of the nosing 26a is required for complete assembly, this element may be of rigid material.

For further resisting such movement the sealing element may be formed with backwardly leaning ridges 24, 24. If desired, the inner surface of the annulus may be similarly formed (not shown), for resisting relative movement between the annulus and the spigot section. These ridges are not essential, however.

The essential features of the joint of Fig. 1 and the manner of assembling the same are applicable as well to pipe sections of the straight-end type as illustrated in Fig. 4. Two pipe sections 30 and 31 are assembled with a pair of sealing elements 32, 33, each like that of Fig. 2, in a coupling sleeve 34 which preferably is provided with a centering rib 35, the procedure of assembly being the same as that above described for Fig. 1. In Fig. 4 the left hand pipe section and annulus are shown partly inserted, the rubber bulging at 36 at the mouth of the sleeve and being positively stretched axially as it is forced into the sleeve.

The modification of Figs. 5 and 6 make possible the final positioning of the bell and spigot pipe sections 40 and 41 before the sealing element is inserted. The resilient element in this form comprises a rubber annulus 42 which is formed with a centrally located annular slot 43 open at the rear end of the annulus and terminating short of the first end of the annulus. For insertion of this rubber element, a sleeve 44, of metal or other stiff material, is positioned in the slot 43 and is utilized to force the rubber element into sealing relation between the bell and spigot, as by means of a forcing tool 45. The rubber is permitted to distend rearwardly in compensation for the reduction in radial thickness, and in order that the rubber may be freely distorted for most effective sealing, the sleeve 44 is formed with staggered slots 46, 46, which permit the sleeve to be reduced in diameter without objectionable buckling. The rubber annulus is provided with an annular nosing 47, as in the previously described forms, and inasmuch as the rubber at the forward end of the slot 43 is subjected to considerable stress by the inserting sleeve, an annular reinforcement 48 is desirably provided. The inserting sleeve 44 may be permitted to remain in the completed joint.

While the forms thus far described are adapted to withstand considerable forces tending to separate the pipe sections longitudinally, the friction between the compressed rubber annulus and the pipe sections resisting such movement, it is desirable in some cases where there is a very strong "line-pull" to provide additional assurance against separation of the joint elements.

In the modification of Figs. 7 and 8, a spigot section 49 is formed at its outer surface and a bell section 50 is formed at its inner surface with one or more circumferential ribs 51, 51, and 53, 53, respectively, which engage a rubber annulus 52 and are preferably inclined, as shown, in the proper direction to resist separation of the pipe sections more effectively. In order to facilitate the filling of the grooves between the ribs 51, 51 and 53, 53, by the rubber, the annulus 54 is preferably molded or otherwise formed, as shown in Fig. 8, initially to approximately the same contour as the ribbed pipe surface, so that in the assembled position, the compressed annulus will completely fill the grooves and be firmly locked with the pipe sections. The rubber annulus is provided with a nosing 55, which, like the nosing in the form of Fig. 1, engages the end face of the spigot section and facilitates assembly, and also serves to restrain the rubber from bulging inwardly in the assembled position.

Additional resistance to longitudinal separation of the pipe sections in any of the embodiments herein described may be provided by forming the rubber contacting surfaces of preferably both the inner and outer sections of a tapered form, the inner surface of the outer member and the outer surface of the inner member both narrowing toward the mouth of the outer section, as shown at 37, 37a and 38, 38a in Fig. 4, so that when the assembled sections tend to separate, the radial distance between them tends to become less and the radial compression of the annulus tends to increase, with an accompanying tendency of the resistance to separation to increase.

In the embodiment of Fig. 9 a rubber annulus 60 has secured to it at its forward end, as by vulcanized adhesion, a nosing element 61 which in this form is held against fore and aft movement relative to the spigot section 62, as by the screw threaded engagement shown, so that this nosing not only holds the forward end of the rubber in place during insertion into the bell section 63 and acts as a guard for the rubber in the assembled joint, but also serves as an abutment on the spigot section to prevent rearward movement of the spigot section relative to the rubber annulus. Rearward movement of the spigot section and rubber annulus relative to the bell section is resisted by a retaining ring 64 secured to the bell section at its mouth as by the screw threaded engagement shown. Any force tending to separate the pipe sections axially is resisted by the rubber annulus which is then longitudinally compressed between the nosing 61 and the retaining ring 64, and this also results beneficially in increasing the sealing pressure of the rubber radially against the pipe sections. This embodiment is accordingly well suited to extremely high fluid pressures.

For assembling this structure, the ring 64 is first slipped over the end of the spigot and is moved far enough back to be out of the way. The rubber annulus 60 is then mounted upon the end of the spigot and by rotating it and its nosing ring 61 the latter is screwed in place, this operation being facilitated by recesses 65, 65 in the ring for the engagement with lugs of a spanner wrench. The spigot and rubber annulus are then forced into place in the bell section, as in the embodiment of Fig. 1, and after this is accomplished, the ring 64 is slid into position and is screwed into the mouth of the bell section preferably into contact with the rubber, though not necessarily pressed against it, whereupon the joint is completed as shown in Fig. 9. Thus a cushioned resistance to separating movement of the pipes is afforded, and also a desirable restraining of the rubber against swelling in case of contact of a solvent fluid with the rubber.

The modification of Fig. 10 provides an alternative method of assembly which is especially advantageous in inserting a rubber annulus of considerably greater thickness than the space between the pipe sections, as may be dictated by the desirability for great sealing pressure of the rubber against the pipe sections. The parts of this embodiment in general are similar to those of the form of Fig. 1, excepting that the rubber annulus 70 is formed at its rear end with a circumferential bead 71 which is preferably reinforced as at 72. The annulus first is mounted upon the spigot section with the nosing 73 of the annulus engaging the end face of the spigot and a suitable tool 74 is then brought into engagement with the bead 71 and is moved rearwardly along the spigot section by any suitable jacking devices (not shown) to stretch the rubber annulus longitudinally as shown in broken lines in Fig. 10. The rubber annulus is thereby reduced in radial thickness and when it is sufficiently thin it is slipped into place in the bell section and the stretching force is removed, whereupon the rubber retracts in length and increases in thickness to the full-line form of Fig. 10, in which it is in its sealing position of the completed joint, pressing resiliently against the pipe walls.

The embodiment of Fig. 11 makes it possible to insert the rubber annulus in the coupling sleeve before the pipe is inserted. A rubber annulus 80, preferably formed with an inwardly directed circumferential bulge, as shown to the left in Fig. 11, and provided with an annular nosing 82, is inserted in a coupling sleeve 83 with the nosing of the annulus in engagement with a centering rib 84 of the sleeve. A pipe 85, having an outer diameter greater than the inner diameter of the rubber annulus, is then forcibly inserted, by which operation the rubber annulus is caused to extend itself backward along the pipe 85 in compensation for its radial compression. Forward movement of the rubber is resisted by the sleeve rib 84 and also by the nosing 82 which, however, may be of a material sufficiently flexible to yield somewhat and be flexed to the position shown at the right in Fig. 11. In order to avoid undesirable buckling of the nosing, it is preferably formed with a serrated margin as at 86. The nosing restrains the rubber from bulging inwardly ahead of the pipe section and in the assembled joint it guards the rubber from deterioration resulting from contact with the conducted fluid. A similar pipe section 85a and rubber annulus 80a are inserted in the other end of the sleeve 83 by a similar procedure to complete the coupling.

The embodiment of Figs. 16 to 18 is especially useful in making a joint in an already laid pipe line, as where a defective pipe section is to be replaced, this embodiment making it possible to assemble the joint conveniently without moving one pipe section relative to another. For this purpose the rubber annulus and its nosing are of a sectional construction as shown at 90, 90 in Figs. 12 and 13, or of a split construction as shown at 91 in the modification of Figs. 14 and 15, in order to permit applying the annulus to the pipe section without having to slip it over the end of the pipe. In the final assembly the slit of the annulus is sealed by the compression of the rubber.

With two pipe sections 92, 93 positioned in their aligned relation, a rubber annulus 94 (Figs. 12, 13 and 16 to 18), which is sectioned at 90, 90 to permit application, is mounted upon the end of pipe 92 with the nosing 95 of the annulus in engagement with the end face of the spigot. A sectional coupling sleeve 96 is assembled about the other pipe section 93 as shown in Fig. 16, and is then forcibly moved to the position of Fig. 17 where the rubber annulus is compressed between it and the pipe section 92. A second sectional annulus 97, similar to the annulus 94, is now mounted upon the end of the pipe section 93, whereupon the sleeve 94 is forcibly moved back to a position compressing both rubber annuli to provide the completed joint shown in Fig. 18.

In some cases it may be desirable to utilize the stretching procedure of Fig. 10 for the first-applied rubber annulus 94, holding the same stretched until the sleeve is moved to the final position of Fig. 18, in order to facilitate moving the sleeve rearwardly over the first annulus, after which it is released as previously described.

The modification of Fig. 19 is adapted especially for coupling lined pipe sections and providing a pipe-protecting seal between the sections. Two pipe lengths 100 and 101, provided with linings 102, 103 of corrosion resisting material, such as rubber composition, are assembled with a coupling sleeve 104 and a pair of sealing annuli 105, 106, preferably of rubber. The nosings of the annuli in this form are constituted by inwardly extending annular portions 107, 108 of the material of the annuli and have return lips 109, 110 engaging the linings of the sections in sealing relation.

These nosings serve the purpose of resisting movement of the annuli relative to the pipe sections during their insertion into the coupling sleeve, and in addition these nosings, when held pressed together in the manner shown, effect a seal between the pipe ends, preventing contact of the fluid with the pipe sections. If desired, the lips 109, 110 may be cemented or otherwise adhered to the pipe linings at the time the annuli are mounted upon the pipe ends, preparatory to assembly into the coupling, and also, if desired, the nosing portions of the annuli may be internally reinforced, although these expedients are not necessary in most cases. For holding the nosings pressed together in sealing relation between the ends of the pipe sections annular collars 111, 112 are provided, these collars having inwardly projecting lugs 113, 113 and 114, 114 engaging cam lugs 115, 115 and 116, 116 integral with the coupling sleeve, and the inner peripheries of these collars seating in circumferential grooves 117 and 118 in the pipe sections. The collars are composed of bolted sections to permit assembly in the pipe grooves. Upon partial rotation of the mounted collars, the pipe sections are caused to be urged and held pressed toward each other by the action of the cam lugs. The provision of the collars, moreover, makes this joint especially suitable to resist separation of the pipe sections under high fluid pressures.

Variations may be made without departing from the scope of the invention as it is hereinafter claimed.

I claim:

1. The method of coupling a pair of pipe members telescopically which comprises providing a resilient annulus of greater radial thickness than the corresponding dimension of the space between the members, mounting said annulus upon the smaller of the two members at the end thereof with the end of the annulus secured against movement longitudinally relative to the member, assembling the other member telescopically therewith with the annulus distended longitudinally along the members in the direction away from the secured end in compensation for the radial compression of the annulus, and providing the outer member with retaining means at the unsecured end of the annulus.

2. The method of coupling a pair of aligned pipe sections which comprises mounting upon the end portion of one of the pipe sections a resilient annulus, telescopically assembling thereupon a rigid sleeve of smaller inner diameter than the outer diameter of the annulus by relative longitudinal movement thereof to a position in which the sleeve is clear of the other pipe section, mounting upon the latter a resilient annulus similar to the first, and longitudinally moving the sleeve to a position in which it compresses both annuli against their respective pipe sections.

3. A method as defined in claim 2 in which the sleeve and resilient annuli are applied to the pipe sections in divided form.

4. A method as defined in claim 2 in which the sleeve is assembled upon at least one of the resilient annuli while the end thereof nearest its pipe end is held against movement relative to its pipe section and compensation for the radial compression of the annulus is effected by longitudinal distension of the annulus in the direction away from its end that is held.

5. A pipe joint assembly comprising a pipe member having its end portion assembled telescopically within an enclosing member, an annulus of resilient material radially compressed between said members and distended longitudinally in compensation for the radial compression, means for holding the innermost end of the annulus against movement relative to the pipe member and means at the outer end of the annulus for preventing outward longitudinal movement of the annulus relative to the enclosing member.

6. A pipe joint assembly comprising a lined pipe section having its end portion assembled telescopically within an enclosing member, and an annulus of resilient material radially compressed between said member and pipe section and distended longitudinally in compensation for the radial compression, said annulus having an annular end portion extending radially inward and engaging the lining of the pipe section in sealing relation.

7. A pipe joint assembly comprising a pair of lined pipe sections having their end portions assembled telescopically within an enclosing member, a pair of annuli of resilient material radially compressed between the respective pipe sections and the member and distended longitudinally in compensation for the radial compression, said annuli having annular end portions extending radially inward and engaging the respective pipe linings in sealing relation, and means for holding the said end portions of the annuli pressed together in sealing relation between the opposed pipe ends.

8. A fluid-seal pipe-joint assembly comprising an outer rigid member and an inner rigid member defining between them an annular space and, mounted in said space, a rubber gasket of such axially elongated form in its unstressed condition as to prevent rolling of it in the axial direction held in such greater axially elongated form as to exert a high radial pressure against the walls of said annular space by reason of its tendency to recoil from the stretched condition to maintain a fluid-seal against high fluid pressure within the pipe assembly.

9. The method of making a fluid-seal pipe-joint assembly which comprises axially stretching a rubber gasket while it is prevented from rolling in the axial direction and mounting it in an annular space between outer and inner pipe members and utilizing its tendency to recoil from the stretched condition to develop high radial pressure against the walls of said space.

10. A fluid-seal pipe-joint assembly comprising an outer rigid member and an inner rigid member defining between them an annular space and, mounted in said space, a rubber ring of substantially cylindrical shape in its unstressed condition, said ring being held in such axially elongated form as to exert a high radial pressure against the walls of said annular space by reason of its tendency to recoil from the stretched condition to maintain a fluid-seal against high fluid pressure within the pipe assembly.

11. A fluid-seal pipe-joint assembly comprising an outer rigid member and an inner rigid member defining between them an annular space and, mounted in said space, a rubber ring of substantially cylindrical shape in its unstressed condition, said ring being held in such axially elongated form as to exert a high radial pressure against the walls of said annular space by reason of its tendency to recoil from the stretched condition to maintain a fluid-seal against high fluid pressure within the pipe assembly, and a nosing of relatively stiff material associated with the innermost end of the ring to resist inward swelling of the rubber in the presence of rubber-swelling fluid in the pipe.

12. A fluid-seal pipe-joint assembly as defined in claim 11 in which the said nosing is of metal in vulcanized adhesion with the rubber and comprises a flange extending radially inward in engagement with the end face of the inner pipe member.

13. A fluid-seal pipe-joint assembly as defined in claim 11 in which the said nosing is of metal in vulcanized adhesion with the rubber and is bevelled and flexibly serrated at its radially outermost portion.

14. The method of making a fluid-seal pipe-joint assembly which comprises axially stretching a rubber ring of substantially cylindrical shape in its unstressed condition and mounting it in an annular space between outer and inner pipe members and utilizing its tendency to recoil from the stretched condition to develop high radial pressure against the walls of said space.

15. The method of making a fluid-seal pipe joint assembly which comprises mounting a rubber-ring upon one of a pair of inner and outer pipe members and anchoring an endmost portion of the ring against movement along the member and assembling the pipe members while stretching the remainder of the ring axially along the pipe member by forcing the members and ring axially together to mount the ring in the annular space between the members and utilizing the tendency of the ring to recoil from the stretched condition to develop high radial pressure against the walls of said space.

16. The method of making a fluid-seal pipe-joint assembly which comprises providing a rubber ring with an inwardly projecting rigid shoulder at one end thereof, mounting it upon the inner of a pair of inner and outer pipe members with the shoulder engaging the end of the pipe member, forcing the ring and member into the outer pipe member and thereby stretching the ring axially away from its shoulder and utilizing the tendency of the ring to recoil from the stretched condition to develop high radial pressure against the walls of the annular space between the members.

TRACY D. NATHAN.